United States Patent
Hughes, Jr.

(10) Patent No.: US 11,845,152 B2
(45) Date of Patent: Dec. 19, 2023

(54) WORKPIECE SUPPORT SYSTEM FOR ROTARY MACHINE

(71) Applicant: Robert Kyle Hughes, Jr., Johnson City, TN (US)

(72) Inventor: Robert Kyle Hughes, Jr., Johnson City, TN (US)

(*) Notice: Subject to any disclaimer, the term of this patent is extended or adjusted under 35 U.S.C. 154(b) by 209 days.

(21) Appl. No.: 17/120,990

(22) Filed: Dec. 14, 2020

(65) Prior Publication Data
US 2021/0178536 A1   Jun. 17, 2021

Related U.S. Application Data

(60) Provisional application No. 62/947,325, filed on Dec. 12, 2019.

(51) Int. Cl.
*B23Q 1/44* (2006.01)
*B65G 13/12* (2006.01)
*B25H 1/18* (2006.01)

(52) U.S. Cl.
CPC .............. *B23Q 1/445* (2013.01); *B25H 1/18* (2013.01); *B65G 13/12* (2013.01)

(58) Field of Classification Search
CPC ............ B25H 1/18; B65G 13/11; B65G 13/12
See application file for complete search history.

(56) References Cited

U.S. PATENT DOCUMENTS

| | | | |
|---|---|---|---|
| 3,054,514 A * | 9/1962 | Riley ..................... | B65G 13/12 198/782 |
| 6,357,705 B1 * | 3/2002 | Hackett ................. | F16M 11/18 248/163.2 |
| 9,260,176 B2 * | 2/2016 | Kulesha ................... | B64C 1/20 |
| 2009/0008513 A1 * | 1/2009 | Preston .................. | E21B 19/15 248/371 |

* cited by examiner

*Primary Examiner* — Tyrone V Hall, Jr.
(74) *Attorney, Agent, or Firm* — Blanchard Horton PLLC

(57) ABSTRACT

A support system to support a workpiece in a rotary machine, the system including a first block member configured to be selectively secured to a system base, at least one lever member having a proximal end rotatably coupled to the first block member, a roller member mounted to a distal end of the at least one lever member, and a variable pressure member coupled to the at least one lever member and configured to rotate the at least one lever member such that the roller member is moved to a desired height.

20 Claims, 3 Drawing Sheets

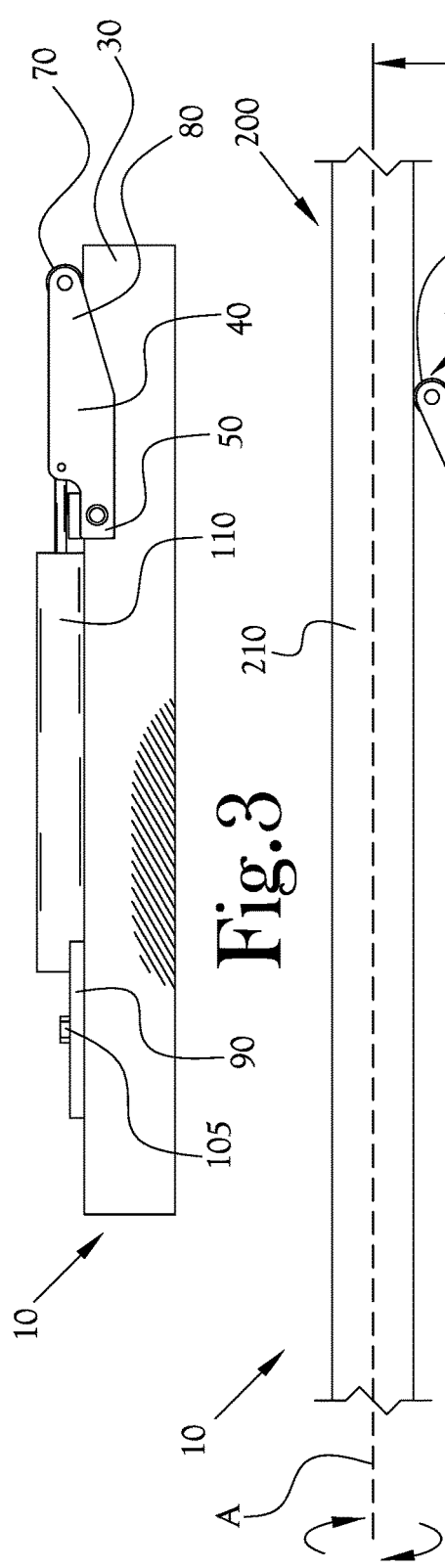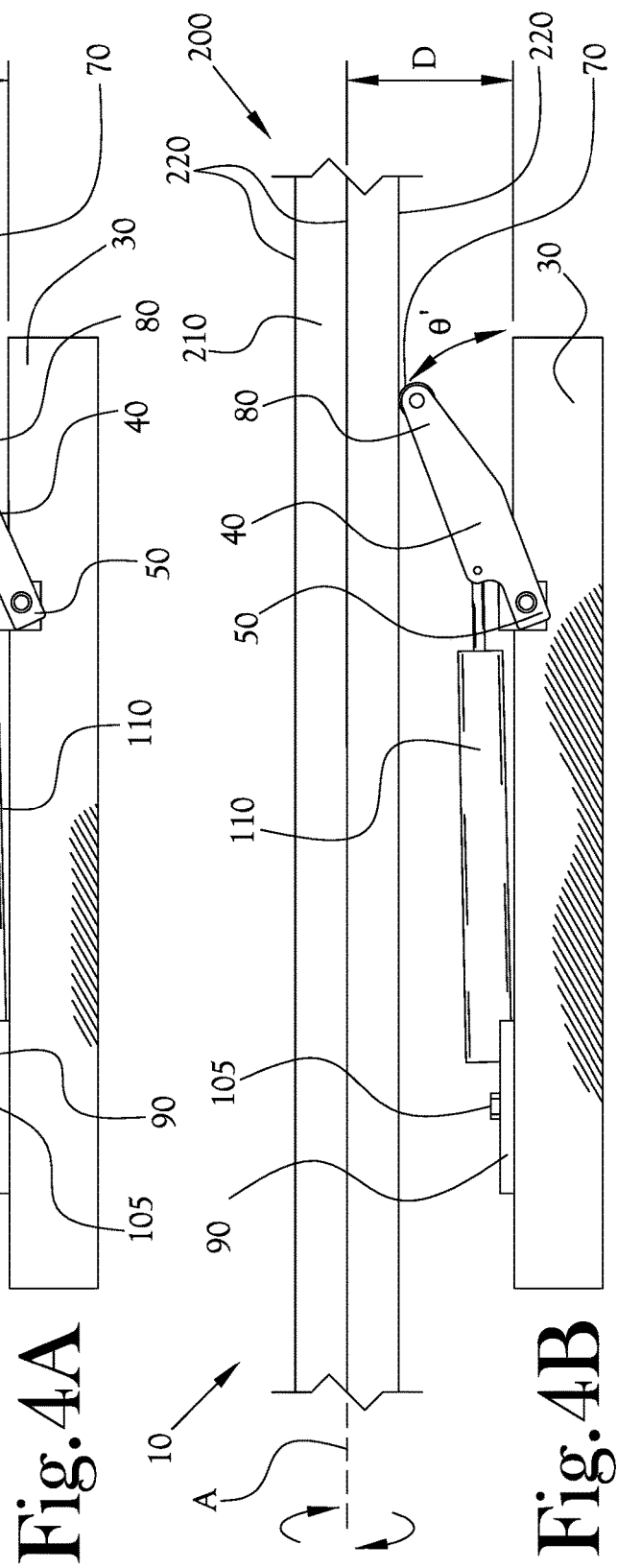

WORKPIECE SUPPORT SYSTEM FOR ROTARY MACHINE

CROSS-REFERENCE TO RELATED APPLICATIONS

This application claims the benefit of U.S. Provisional Patent Application No. 62/947,325, filed on Dec. 12, 2019, which is incorporated herein in its entirety by reference.

FIELD OF INVENTION

The present general inventive concept relates to workpiece support system, and, more particularly, to a height adjustable workpiece support system that can support round or non-round workpieces.

BACKGROUND

Rotary machines typically use one of two ways to rotate a workpiece that is being tooled on the rotary machine. The first is using a 3 or 4 jaw lathe chuck, whereby the workpiece is mounted directly into the chuck on one end, and the other end is supported by fixed height rollers that the workpiece will rotate on. The second is to place the workpiece onto motorized rollers. As the rollers turn, the workpiece rotates. In both of these conventional cases the supports are usually required to be placed at the ends of the workpiece in order to limit the amount the ends of the workpiece wobble off axis during rotation.

A long workpiece may require the supports to be separated by such a distance that results in the workpiece sagging between the rollers. As a fix, additional rollers are typically placed between the end rollers. Some conventional machines incorporate a method in which a pivoting roller is moved into and out of position as the chuck is moved along the driving axis of the machine. This is typically adequate only for round shapes, because the roller is of a fixed height. Such a procedure and system will not work for non-round shapes, which have an irregular outer surface that includes different lengths extending away from the driving axis of the machine. Therefore, a system to support such irregular shapes would be desirable.

BRIEF SUMMARY

According to various example embodiments of the present general inventive concept, a lift or support system is provided to vertically support workpieces being rotated by a rotary machine, such as a lathe.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a support system to support a workpiece in a rotary machine, the system including a first block member configured to be selectively secured to a system base, at least one lever member having a proximal end rotatably coupled to the first block member, a roller member mounted to a distal end of the at least one lever member, and a variable pressure member coupled to the at least one lever member and configured to rotate the at least one lever member such that the roller member is moved to a desired height.

The foregoing and/or other aspects and advantages of the present general inventive concept may also be achieved by providing a support system to support a workpiece in a rotary machine, the system including a first block member configured to be selectively secured to a system base, a pair of lever members having respective proximal ends rotatably coupled to opposite sides of the first block member, a roller member extending between distal ends of the lever members, a second block member configured to be selectively secured to the system base a distance away from the first block member and a variable pressure member having a first end rotatably coupled to one of the lever members, and a second end rotatably coupled to the second block member, wherein the variable pressure member is configured to rotate the at least one lever member such that the roller member is moved to a desired height, the first end being rotatably coupled to a point above a rotational axis of the lever members, and farther from the second block member than is the rotational axis of the at least one lever member, when the roller member is lowered to be proximate the system base.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 3 illustrates a side view of the support system of FIG. 1 at a lowered position; and FIGS. 4A-4B illustrate side views of the support system of FIG. 1 during a workpiece rotating operation.

DETAILED DESCRIPTION

Figure 1:
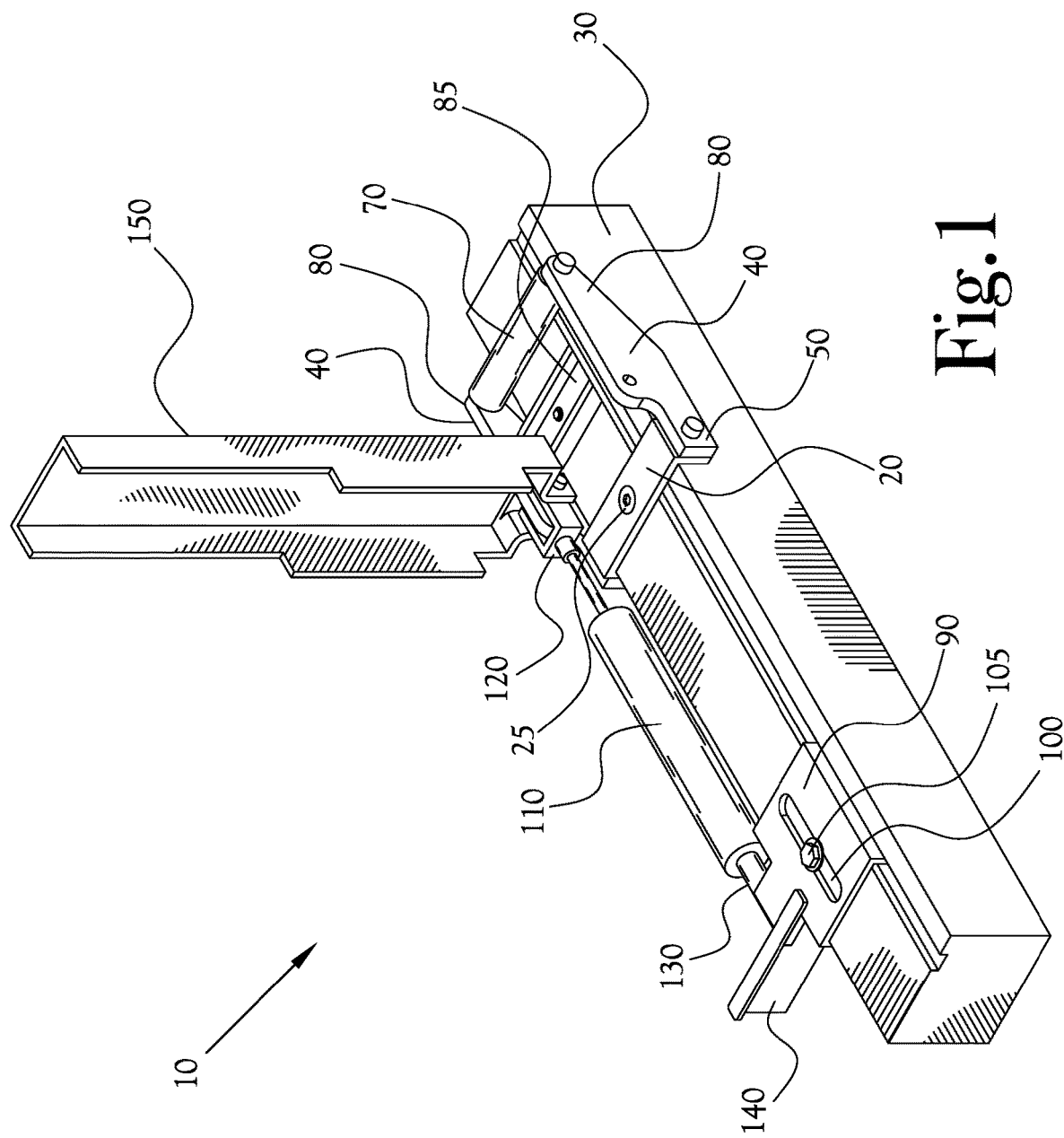
FIG. 1 illustrates a perspective view of a support system for a rotary machine according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a lift or support system is provided to vertically support workpieces being rotated by a rotary machine, such as a lathe. It is noted that the system of the present general inventive concept may be referred to herein interchangeably as a lift system or support system, as the system includes a support roller member that is controlled to be lifted to a desired height at which the roller member may be held static, or may be controlled to allow some give in a downward direction while remaining biased upward toward the desired holding height. The support system according to various example embodiments functions as a lifter system to support and minimize sagging of a workpiece during operations performed on the workpiece, such as rotary cutting, marking, etc., as the workpiece is rotated by a rotary machine. The general term workpiece will be used herein to represent any of a variety of different pieces that may be rotated by a rotary machine to be machined or otherwise worked on in various operations such as those listed above. Various example embodiments of the present general inventive concept address the problems that occur when supporting non-round workpieces such as, for example, rectangular pieces, square tubes, structural shapes such as an L angle, channel, I-beam, polygon shaped tubes, and custom welded structures during rotation.

FIG. 1 illustrates a perspective view of a support system for a rotary machine according to an example embodiment of the present general inventive concept. In the example embodiment illustrated in FIG. 1, the lifter system or support system 10 includes a first block member 20 that is configured to be selectively secured to a base on which the system 10 is to be mounted, and which may be referred to herein as a system base 30. The system base 30 may be a support rail with various connection portions such as, for example, bolt holes, grooves, etc., to allow various devices and systems associated with a rotary machine system to be secured thereto and used during various machining operations. In the example embodiment illustrated in FIG. 1, the first block member 20 is bolted to the system base 30 by a bolt 25, but it is understood that various other types of securing members may be employed to fix the first block member 20 in place. The first block member 20 may be selectively secured to various places on the system base 30 according to the desired placement of a user, which may be dependent upon the length and/or configuration of the workpiece being rotated by the rotary machine. While no rotary machine is shown in the drawings discussed herein, it will be understood by one skilled in the art that a support surface, base, rail 30 will typically be arranged longitudinally substantially parallel with the rotational axis of the rotary machine, or the longitudinal axis of the workpiece being rotated by the rotary machine. In the example embodiment illustrated in FIG. 1, a pair of levers 40 are arranged such that proximal ends 50 of the levers 40 are rotationally coupled to opposite sides of the first block member 20, with a roller 70 being arranged between distal ends 80 of the levers 40. In various example embodiments, only one lever member may be provided to the support system, and rotationally coupled at a point on the first block, with the roller 70 supported on a distal end thereof. Also, while the roller 70 is configured to be substantially cylindrical, various other example embodiments may provide one or more differently configured roller members. In various example embodiments the roller 70 can be selectively removable, and a plurality of differently configured roller members may be selectively attached to the levers 40 for different types of support, polishing, etc. The roller 70 of the system 10 is arranged such that a rotational axis of the roller 70 is substantially perpendicular to the longitudinal axis of the system base 30, but other arrangements can be provided without departing from the scope of the present general inventive concept. A brace 85 extends between the levers 40 in this example embodiment to provide more stability to the levers 40.

In the example embodiment illustrated in FIG. 1, a second block member 90 is configured to be attached to the system base 30 a distance away from the first block member 20. In various example embodiments the second block member 90 may be configured to be fixed to a single distance from the first block 20, but in the example embodiment illustrated in FIG. 1 the second block member 90 is configured to be adjustable regarding the distance to the first block member 20 due to a groove 100 formed in the second block member 90 and configured to accept a bolt 105 at various points along the groove 100 so that the distance between the first block 20 and the second block 90 is adjustable. The bolt 105 may be threaded into a bolt-hole already provided in the system base 30. In various example embodiments the second block member 90 may be secured to the system base 30 in different manners. As illustrated in FIG. 1, a variable pressure member 110 is configured with a first end 120 rotationally coupled to one of the levers 40, and a second end 130 rotational coupled to the second block member 90. In this example embodiment the variable pressure member 110 is a pneumatic cylinder, but other variable pressure members may be used in various example embodiments without departing from the scope of the present general inventive concept. The first end 120 of the variable pressure member 110 is coupled to the one lever 40 at a position higher than the rotational axis of the levers 40 about the first block member 20, and at a position farther from the second block member 90 than is the first block member 20 when the roller 70 is in a lower position proximate the system base 30. In other words, in this example embodiment, when the roller is lowered to a point such as where the roller 70 would be when not in use, the distance between the first block member 20 and the second block member 90 is shorter than the distance between the second block member 90 and the rotatable coupling of the first end 120 of the variable pressure member 110 to the lever 40. With such an arrangement, by actuating the variable pressure member 110 to shorten in length, the levers 40 are controlled by the variable pressure member 110 to rotate about the rotational axis of the coupling between the levers 40 and the first block member 20. Thus, by shortening the length of the variable pressure member 110, the levers 40 are rotated such that the roller 70 is moved upwards to a desired position, and by increasing the length of the variable pressure member 110, the levers 40 are rotated in the other directions such that the roller 70 is moved downwards to another desired position, or a rest position, and so on. As discussed herein, the variable pressure member 110 can be controlled such that the roller 70 is raised to a desired position to be maintained through much or most of a rotary operation of a workpiece resting upon the roller 70, yet such that the roller 70 will lower to allow the surface of the roller 70 to follow an irregularly shaped workpiece while maintaining supporting contact, but remaining biased upward to the desired position. While the example embodiment illustrated in FIG. 1 includes the variable pressure member 110 extending from the second block member 90 to the first block member 20, in various other example embodiments a variable pressure member may be configured in a host of other ways. For example, a variable pressure member may be connected at the second end to the first block member 20 itself, or another part of the rotary machine system proximate the first block member 20, to provide the lifting control of the levers 40 and, therefore, the roller 70. Also, in various example embodiments of the present general inventive concept the variable pressure member may be, for example, pneumatic, hydraulic, electric, and so on. In the example embodiment illustrated in FIG. 1, since the variable pressure member 110 is rotatably coupled at the first end 120 to the lever 40, and at the second end 130 to the second block member 90, at least some rotation is allowed at both ends to accommodate for the movement of the elongated variable pressure member 110 during rotation of the lovers 40 about the rotational axis formed by the coupling of the levers 40 to the first block member 20. In the example embodiment illustrated in FIG. 1, the first block member 20 wraps partially around opposite side surfaces of the system base 30, and one side of the second block member 90 extends at least partially into a groove formed in the system base 30. However, various example embodiments may provide a host of common configurations to secure the first and second block members 20, 90 to the system base 30. In the example embodiment of FIG. 1, the second end 130 of the variable pressure member 110 is coupled to an extension member 140 extending from the second block member 90 to couple the variable pressure member 110 to the second block member 90, but a host of other configurations are possible to rotatably couple the variable pressure member 110 to the second block member 90. Thus, in various example embodiments of the present general inventive concept, the levers attached to the support roller may be actuated by a variable pressure method that allows the roller to float up and down to comply with the shape of the workpiece as the workpiece is rotated around the driving axis of the rotary machine. Thus, the upward force provided by the roller and levers is adjustable. The levers are coupled to a variable pressure member which may be adjustable to provide the desired amount of floating upward force to the roller. The pressure may be set so that the roller applies an upwards force on to the workpiece that minimizes sag. Thus, the pressure placed on the levers, and therefore the roller, is adjustable to the pressure required to level the workpiece to maintain the axis of rotation.

Figure 2:
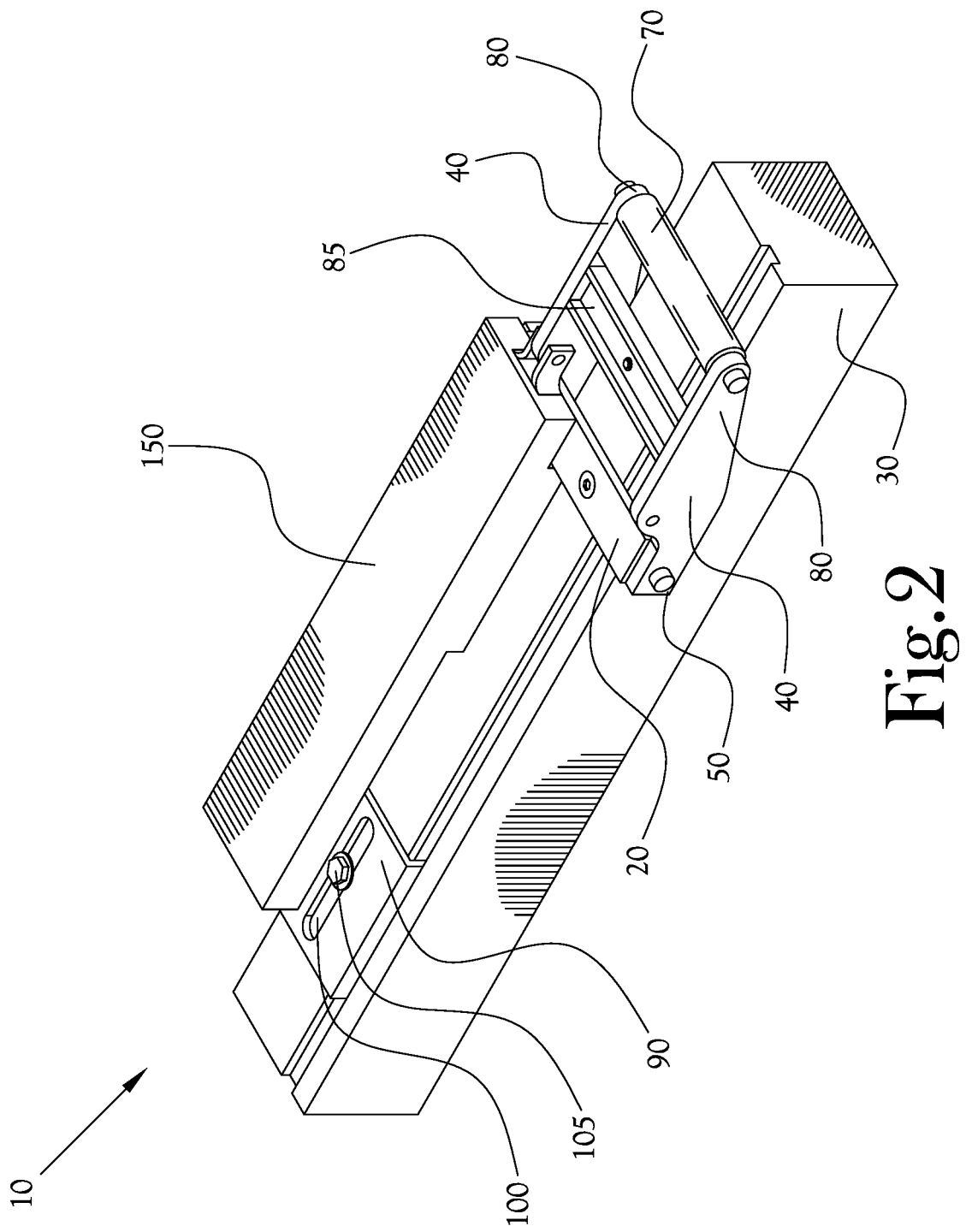
FIG. 2 illustrates another perspective view of the support system of FIG. 1.

In the example embodiment illustrated in FIG. 1, a cover member 150 is configured to be rotatable coupled to the lever 40 at the same point at which the first end 120 of the variable pressure member 110 is rotatable coupled to the lever 40. With such a configuration, the cover member 150 can be raised and lowered independently of the movements of the levers 40 during the operation of the system 10, and also can move to accommodate the movement of the levers 40 during such operations. The cover member 150 is configured with a top and two sides that cooperate to cover the variable pressure member 110 when in the lowered position, to protect the variable pressure member 110 and other components and users from the movements involved with the variable pressure member 110. Thus, when the variable pressure member 110 is controlled to shorten, which causes the levers 40 to begin to rotate upwards, the cover member 150 can move along with such rotational movement, with a free opposite end that is configured to simply rest over the area proximate the second ends 130 of the variable pressure member 110, sliding over the area corresponding to the actions of the variable pressure member 110. In various example embodiments the variable pressure member 110 may be configured with one or more control lines in electrical communication with a system controller to automate the movements of the levers 40, and in other various example embodiments the variable pressure member 110 may be set directly by a user operating pressure controls on the variable pressure member 110. In an automated system, the irregular outer surface of the workpiece being supported can be programmed in the controller such that the roller 70 is automatically controlled to follow the irregular contour at a sufficient supporting force for the workpiece. FIG. 2 illustrates another perspective view of the support system of FIG. 1. In both FIGS. 1 and 2 the system 10 is shown at "rest," with the levers 40 and roller 70 lowered to a position in which the roller 70 is proximate the upper surface of the system base 30, as the roller 70 is not in use. In FIG. 1 the cover member 150 has been raised to expose the variable pressure member 110 and various connections thereof, and in FIG. 2 the cover member has been lowered to cover the variable pressure member 110 and second end 130 coupling. FIG. 3 illustrates a side view of the support system of FIG. 1 at a lowered position, but with the cover member 150 omitted for clarity of the other illustrated components.

One example workpiece for which support is improved by embodiments of the present general inventive concept is a square or rectangular workpiece. As such a workpiece rotates, the corners are oscillating up and down in reference to the axis of the workpiece. The support system 10 of an example embodiment of the present general inventive concept may be mounted near the mid-point of the workpiece at the point of maximum sag, and could be adjusted to the pressure required to level the tube. Since the system is compliant, as the tube rotates the corners will push the rollers downward, but the rollers would still be applying an upward force to help minimize sag.

FIGS. 4A-4B illustrate side views of the support system of FIG. 1 during a workpiece rotating operation in which a substantially square workpiece 200 is being rotated by a rotary machine. The workpiece 200 extends to a rotary machine (not shown) at one end, and the system 10 is provided to prevent sag of the workpiece 200 during the various operations performed while the workpiece 200 is being rotated. In FIGS. 4A-B the workpiece 200 is configured with a plurality of flat surfaces 210, and corners 220 at the edges of the flat surfaces 210. Thus, when the workpiece 200 is being rotated, the distance between any one of the corners 220 and the axis of rotation A of the workpiece 200 is greater than the distance between any one of the flat surfaces 210 and the axis of rotation A, while the distance D from the top surface of the system base 30 to the axis or rotation A will remain substantially the same. Thus, the variable pressure member 110 is set to move the levers 40 such that the roller 70 is moved to the highest position needed to support the workpiece 200, which is the position in which the roller 70 contacts any of the flat surfaces 210 when the bottommost flat surface 210 is substantially horizontal, but is able to be lowered while maintaining contact with the workpiece 200 when one of the corners 220 is at the bottommost position during rotation. Thus, since the roller 70 is biased to return to the upmost set position, the roller 70 will maintain contact with the workpiece 200 constantly during the rotation of the workpiece about the axis of rotation A, moving downward to accommodate the approach of a corner 220, and biased to move back upward as that corner 220 moves away so that the flat surface 210 is supported. FIG. 4A illustrates the roller 70 in contact with a flat surface 210 that is at the bottom of the workpiece 200 during that point in rotation, and FIG. 4B illustrates the roller 70 having been lowered to maintain contact with a corner 220 that is at the bottom of the workpiece 200 during that point in rotation. The roller 70 moves down and up so that contact is maintained, and thus support of the workpiece 200 is maintained, preventing sagging of the workpiece 200.

While the example embodiment thus described offers an improved performance when supporting non-round workpieces, it can also be quickly and easily adjusted to perform optimal support for a round workpiece. Round workpieces do not require a floating roller, but rather one of a fixed height. As mentioned earlier, conventional systems are currently in use to accomplish this task. However, systems according to the present general inventive concept improve on those methods by providing easier and quicker setup. The system of the present general inventive concept utilizes an adjustable bearing block, or adjuster block, attached to an end of the variable pressure member. The pressure may be adjusted high enough so that the roller cannot float up or down under the weight of the workpiece. The workpiece is loaded into the machine and the adjuster block is moved to a position that raises the roller to be in contact with the workpiece at a height that minimizes sag. Utilizing a single bolt in some example embodiments, the adjustable block may be locked into position. This entire operation can be accomplished in seconds. Conventional systems utilize a much more time-consuming method.

Some conventional systems use a roller mounted onto a vertical shaft that pivots 90 degrees into and out of the machine as the driving chuck moves by. Such implementations are large and relatively slow acting because of the distance they need to travel, and the fact that they are mounted on the side of the machine and therefore farther from the work piece. Systems according to various example embodiments of the present general inventive concept place the lift roller below and in the center of the workpiece. One advantage of this is the distance the roller must travel to engage the workpiece is much shorter, and therefore requires much less time to actuate compared with conventional implementations. This drastically reduces the length of time that the roller is disengaged in order to clear the moving parts of the machine that may need to pass over the lifter system. Operations may also be done to the workpiece much closer to the lifter system because of the decreased disengagement time. Thus, the present general inventive concept provides a more compact and quicker acting solution compared to conventional systems.

Another benefit of the roller lifting vertically into the workpiece, as compared to pivoting from the side and into position, is the elimination of the sliding action of the roller on the workpiece as it swings into position. The negative consequence of such a sliding action is the creation of scratches on soft workpieces such as plastic and aluminum. Thus, the present general inventive concept minimizes damage to the workpiece during activation. Various example embodiments of the present general inventive concept provide a system that allows the use of non-round support pads instead of conventional round rollers. For example, a squared block of plastic may be used to provide greater surface area to support work pieces that may be marked or damaged by the very small contact patch provided by a round roller.

Various example embodiments of the present general inventive concept may provide a support system to support a workpiece in a rotary machine, the system including a first block member configured to be selectively secured to a system base, at least one lever member having a proximal end rotatably coupled to the first block member, a roller member mounted to a distal end of the at least one lever member, and a variable pressure member coupled to the at least one lever member and configured to rotate the at least one lever member such that the roller member is moved to a desired height. The first block member may be secured to the system base in a fixed position. The variable pressure member may be pneumatic, hydraulic, or electric. The at least one lever member may be configured as two lever members coupled to opposite sides of the first block member, the roller member extending between the distal ends of the two lever members. A first end of the variable pressure member may be rotatably coupled to the at least one lever member at a position higher than a rotational axis of the at least one lever member. The system may further include a second block member configured to be selectively secured to the system base, wherein a proximal end of the variable pressure member may be rotatably coupled to the second block member, and wherein a distal end of the variable pressure member may be rotatably coupled to the first block member. The second block member may be configured to be adjustable such that a distance between the first and second block members can be changed. The distal end of the variable pressure member may be rotatably coupled to the first block member at a point higher than a rotational axis of the at least one lever member, and farther from the second block member than is the rotational axis of the at least one lever member, when the roller member is in the lowered position. The variable pressure member may be a pneumatic cylinder. The system may further include a cover member rotatably coupled to the at least one lever member and configured to rest over the variable pressure member during rest and movement of the at least one lever member. The variable pressure member may be configured to selectively place an amount of pressure on the at least one lever member such that the roller member is biased upward to the desired height, but may lower to follow an uneven surface of a workpiece moving on the roller member. The variable pressure member may be configured to selectively place an amount of pressure on the at least one lever member such that roller member maintains the desired height while a workpiece is moving on the roller member. The roller member may be configured to be selectively removable. The system may further include a plurality of differently configured roller members configured to provide different workpiece support surfaces. The system base may be a rail with a substantially flat upper surface. A rotational axis of the roller member may be substantially parallel with the substantially flat upper surface of the rail. The variable pressure member may be configured to be operated by an automated system controller, such as a microprocessor. The at least one lever member may be configured as two lever members rotatably coupled at respective proximal ends to opposite sides of the first block member, the roller member extending between distal ends of the two lever members. At least a portion of the roller member may be configured as a cylinder.

Various example embodiments of the present general inventive concept may provide a support system to support a workpiece in a rotary machine, the system including a first block member configured to be selectively secured to a system base, a pair of lever members having respective proximal ends rotatably coupled to opposite sides of the first block member, a roller member extending between distal ends of the lever members, a second block member configured to be selectively secured to the system base a distance away from the first block member and a variable pressure member having a first end rotatably coupled to one of the lever members, and a second end rotatably coupled to the second block member, wherein the variable pressure member is configured to rotate the at least one lever member such that the roller member is moved to a desired height, the first end being rotatably coupled to a point above a rotational axis of the lever members, and farther from the second block member than is the rotational axis of the at least one lever member, when the roller member is lowered to be proximate the system base.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A support system to support a workpiece in a rotary machine, the system comprising:
   a first block member configured to be selectively secured to a system base;
   at least one lever member having a proximal end rotatably coupled to the first block member;
   a roller member mounted to a distal end of the at least one lever member; and
   a variable pressure member coupled to the at least one lever member and configured to resiliently bias the at least one lever member toward rotational movement to a desired height.

2. The system of claim 1, wherein the first block member is secured to the system base in a fixed position.

3. The system of claim 1, wherein the variable pressure member is pneumatic, hydraulic, or electric.

4. The system of claim 1, where the at least one lever member is configured as two lever members coupled to opposite sides of the first block member, the roller member extending between the distal ends of the two lever members.

5. The system of claim 1, wherein a first end of the variable pressure member is rotatably coupled to the at least one lever member at a position distal to a rotational axis of the at least one lever member.

6. The system of claim 1, further comprising:
   a second block member configured to be selectively secured to the system base;
   wherein a proximal end of the variable pressure member is rotatably coupled to the second block member; and
   wherein a distal end of the variable pressure member is rotatably coupled to the at least one lever member.

7. The system of claim 6, wherein the second block member is configured to be adjustable such that a distance between the first and second block members can be changed.

8. The system of claim 6, wherein the distal end of the variable pressure member is rotatably coupled to the at least one lever member at a point distal to a rotational axis of the at least one lever member and farther from the second block member than is the rotational axis of the at least one lever member when the roller member is in a lowered position.

9. The system of claim 6, wherein the variable pressure member is a pneumatic cylinder.

10. The system of claim 6, further comprising a cover member rotatably coupled to the at least one lever member and configured to rest over the variable pressure member during rest and movement of the at least one lever member.

11. The system of claim 1, wherein the variable pressure member is configured to selectively place an amount of pressure on the at least one lever member such that the roller member is biased upward to the desired height, but will lower to follow an uneven surface of a workpiece moving on the roller member.

12. The system of claim 1, wherein the variable pressure member is configured to selectively place an amount of pressure on the at least one lever member such that roller member maintains the desired height while a workpiece is moving on the roller member.

13. The system of claim 1, wherein the roller member is configured to be selectively removable.

14. The system of claim 13, further comprising a plurality of differently configured roller members configured to provide different workpiece support surfaces.

15. The system of claim 1, wherein the system base is a rail with a substantially flat upper surface.

16. The system of claim 15, wherein a rotational axis of the roller member is substantially parallel with the substantially flat upper surface of the rail.

17. The system of claim 1, wherein the variable pressure member is configured to be operated by a system controller.

18. The system of claim 1, wherein the at least one lever member is configured as two lever members rotatably coupled at respective proximal ends to opposite sides of the first block member, the roller member extending between distal ends of the two lever members.

19. The system of claim 1, wherein at least a portion of the roller member is configured as a cylinder.

20. A support system to support a workpiece in a rotary machine, the system comprising:
- a first block member configured to be selectively secured to a system base;
- a pair of lever members having respective proximal ends rotatably coupled to opposite sides of the first block member;
- a roller member extending between distal ends of the lever members;
- a second block member configured to be selectively secured to the system base a distance away from the first block member; and
- a variable pressure member having a first end rotatably coupled to one of the lever members, and a second end rotatably coupled to the second block member;
- wherein the variable pressure member is configured to resiliently bias the distal end of the at least one lever member toward a desired height, the first end being rotatably coupled to a point distal to a rotational axis of the lever members and farther from the second block member than is the rotational axis of the at least one lever member when the roller member is lowered to be proximate the system base.

* * * * *